United States Patent
Wang et al.

(10) Patent No.: US 7,366,945 B2
(45) Date of Patent: Apr. 29, 2008

(54) METHOD OF SETTING BACKUP OF HOME LOCATION REGISTER

(75) Inventors: Jincheng Wang, Shenzhen (CN); Guangbin Meng, Shenzhen (CN); Chang Zhou, Shenzhen (CN); Jianbao Zhang, Shenzhen (CN); Hao Ding, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 463 days.

(21) Appl. No.: 10/500,076

(22) PCT Filed: Jul. 23, 2002

(86) PCT No.: PCT/CN02/00516

§ 371 (c)(1),
(2), (4) Date: Nov. 15, 2004

(87) PCT Pub. No.: WO03/056756

PCT Pub. Date: Jul. 10, 2002

(65) Prior Publication Data

US 2005/0081095 A1    Apr. 14, 2005

(30) Foreign Application Priority Data

Dec. 24, 2001   (CN)   ............................. 01 1 44930

(51) Int. Cl.
*G06F 11/00* (2006.01)
(52) U.S. Cl. .......................................... 714/4; 455/433
(58) Field of Classification Search .................. 714/4; 455/433
See application file for complete search history.

(56) References Cited

U.S. PATENT DOCUMENTS

| | | | | |
|---|---|---|---|---|
| 5,623,532 | A * | 4/1997 | Houde et al. ................ | 455/445 |
| 6,223,038 | B1 * | 4/2001 | Iseyama et al. ........... | 455/435.3 |
| 6,594,490 | B1 * | 7/2003 | Ushiki et al. ................ | 455/433 |
| 7,013,139 | B1 * | 3/2006 | Gan et al. ................. | 455/432.3 |
| 7,113,795 | B2 * | 9/2006 | Somani et al. ........... | 455/456.1 |
| 2004/0185871 | A1 * | 9/2004 | Somani et al. ........... | 455/456.1 |
| 2007/0101141 | A1 * | 5/2007 | Sowa et al. ................. | 713/171 |

FOREIGN PATENT DOCUMENTS

| | | |
|---|---|---|
| CN | 1266340 A | 2/2000 |
| CN | 1297659 A | 5/2001 |
| WO | WO 01/03443 A2 | 1/2001 |

* cited by examiner

*Primary Examiner*—Bryce P Bonzo
(74) *Attorney, Agent, or Firm*—Wolf, Greenfield & Sacks, P.C.

(57) ABSTRACT

The present invention discloses a method for backup of Home Location Register (HLR), comprising: configuring a universal HLR as a disaster recovery center HLR which is to backup many HLRs, establishing network connection and loading user data to disaster recovery center through uniform text files; during operating, each active HLR will synchronize the user's data to the disaster recovery center; and a signaling will be forwarded to disaster recovery center to process after active HLR fails. So the present invention can realize service backup compatibility with equipment by different manufacturers, decrease cost, and be realized and managed easily, therefore the present invention has solved problems of characteristic service data backup in different HLRs.

7 Claims, 1 Drawing Sheet

METHOD OF SETTING BACKUP OF HOME LOCATION REGISTER

FIELD OF THE INVENTION

The present invention relates to data and service backup for communication equipment, particularly to a method for backup of home location register (HLR).

BACKGROUND OF THE INVENTION

HLR is an important device that stores subscriber data. As mobile subscribers grow rapidly and communication technologies develops progressively, the capacity of a single HLR often reaches to hundreds of thousands of records or even more. In case of long downtime due to power breakdown, fire disaster, earthquake or lightning strike, mobile services of relevant contract subscribers will be interrupted; therefore, it is urgent to implement remote backup for HLRs.

Presently, there are mainly two solutions: one is data backup only; the other is service backup based on data backup, i.e., if the active HLR fails, the backup HLR will take over the traffic to ensure uninterrupted traffic at its maximum. Owing that there are different manufacturers of HLRs and storage formats and processing modes of subscriber data in the HLRs, and that local data backup (i.e., periodical subscriber data backup on tape drive or disk) is implemented for the HLRs primarily, service backup is still in bud. Usually, remote backup solution is the incompatible 1+1 one, e.g., some developed commercial backup software from a third party is used or extensive MAP (mobile application part) signaling is implemented. The 1+1 backup solution may be an active/backup unidirectional one or a cycled one in mutual backup mode, and the extensive MAP (mobile application part) signaling is typically implemented to achieve 1+1 cycled backup. According to said method of 1+1 cycled backup, each HLR stores not only its own subscriber data but also subscriber data of the other HLR; the subscriber data is identified internally with "active/backup" identifier. Besides receiving and processing standard signaling or operation instructions to it according to normal workflow, each HLR also informs the corresponding backup HLR of varied subscriber data resulted from these signaling or operation instructions so as to enable the backup HLR to implement data synchronization. The extensive MAP signaling contains such operation instructions as modification, addition and deletion. The method has the following problems:

(1) High cost: Employing a backup system for each of the numerous HLRs in the network requires high cost, especially in case of low probability of HLR malfunction. Although the number of HLRs needs not to increase in 1+1 cycled backup mode, each HLR has to store the subscriber data of the other HLR, resulting in high upgrade cost.

(2) Complicated technology and long implementation cycle: The HLRs have to not only inform their counterparts of varied subscriber data in standard signaling mode but also receive and process subscriber data synchronization signaling from their counterparts, resulting in high workload in modification of software system.

(3) Difficult management: it is difficult to manage each HLR because it stores the subscriber data of the other HLR.

(4) Clear solution for compatibility is unavailable, in particular in backup of manufacturer-defined special service data.

SUMMARY OF THE INVENTION

It is an object of the present invention to provide a method for backup of HLR, which is easy to implement and can decrease cost and enhance compatibility.

To attain said object, a method for backup of HLR according to the present invention comprises: configuring a common HLR as a disaster recovery center HLR which is used to backup multiple HLRs, then establishing network connections between each operating active HLR and said disaster recovery center HLR, and then loading subscriber data of each active HLR to said disaster recovery center HLR through uniform-formatted text files which describe standard services of the protocol in a standard format;

During normal operation, synchronizing varied data of said active HLRs to said disaster recovery center HLR;

If an active HLR fails, forwarding the signaling which is sent to said fault active HLR to the disaster recovery center HLR to process through modifying route configuration of the corresponding service switching point;

recovering the data of said active HLR by said disaster recovery center HLR through uniform-formatted text files after said active HLR recovers, redirecting the signaling to said active HLR from said disaster recovery center HLR through modifying route configuration of the corresponding service switching point after the data of said active HLR and disaster recovery center HLR is consistent.

With above solution, a common HLR can make subscriber data backup for multiple operating active HLRs in the network, and data synchronization through uniform-formatted text files can be implemented, so that it is easy to realize compatible service backup between an active HLR and other devices made by different manufacturers. The method has the following advantages:

(1) Reduced cost: Compared with 1+1 backup solution, employing a disaster recovery HLR can reduce equipment cost significantly;

(2) Easy implementation and reduced technical complication: The active HLRs need to convert subscriber data into uniform-formatted text files without complicated data communication, all communication work is finished by the disaster recovery center HLR, thus the affect to operating systems is minimized.

(3) Simplified management: The HLRs only store and process the home subscriber data and do not affect the traditional management mode; disaster recovery center stores subscriber data of multiple active HLRs, but the subscriber data has been converted into uniform-formatted format, which centralizes the management of all maintenance work, thus the total management cost of the disaster recovery system is reduced.

(4) Easy backup of special service data of HLRS, enhanced availability of the data of the disaster recovery center; and employing standard text files for subscriber data simplifies interface and enhances compatibility.

In conclusion, the present invention substitutes traditional 1+1 backup solution with N+1 solution, and the disaster recovery center HLR can takeover the service information of multiple fault HLRs. The processing capacity depends on that of the disaster recovery center HLRs.

DETAILED DESCRIPTION OF THE EMBODIMENT

Figure 1:
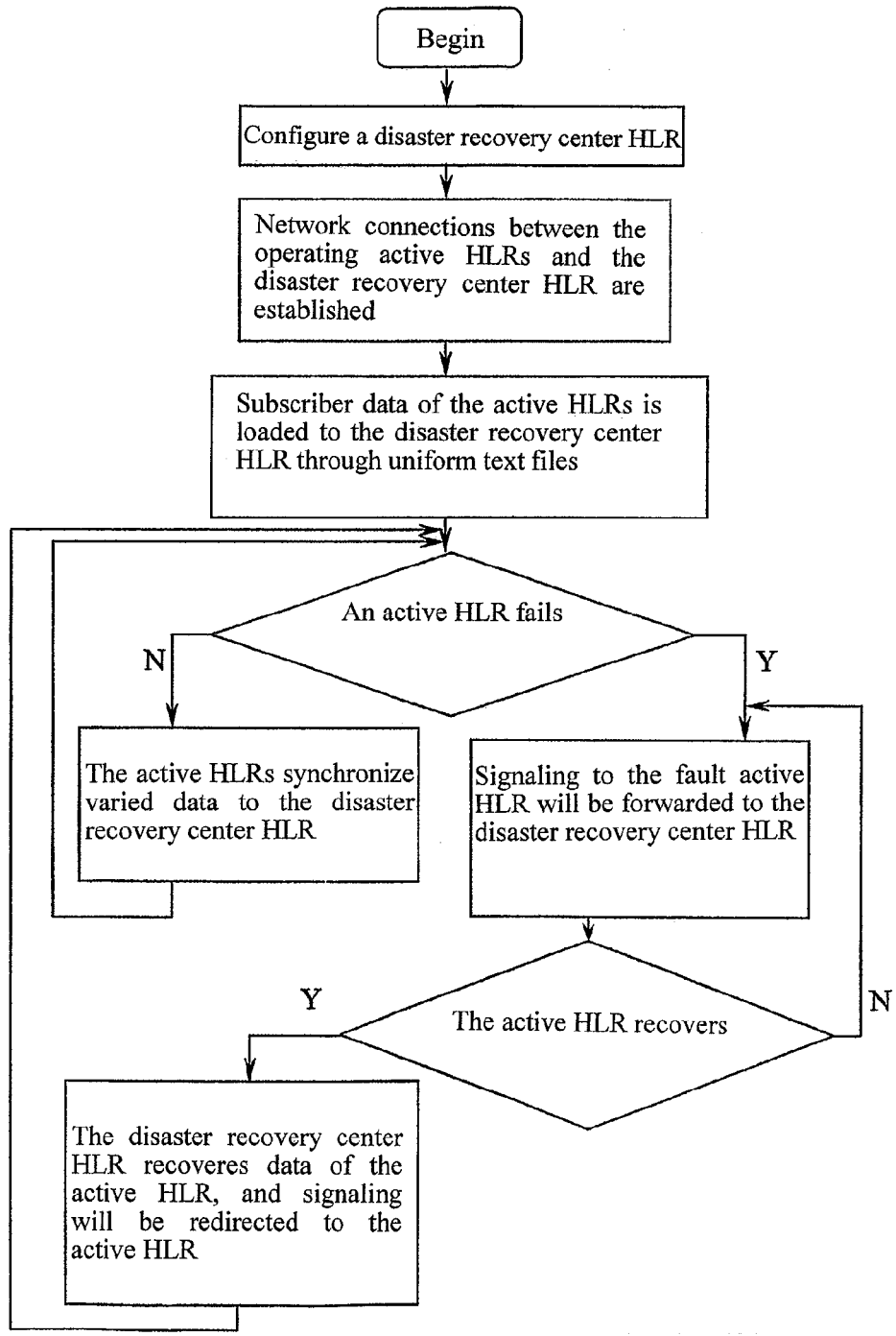
FIG. 1 is the flow diagram of the method according to the present invention.

The present invention will be described in further detail with reference to the following embodiment and the attached drawing.

As shown in FIG. 1, the method for backup of HLR according to the present invention is as follows: configuring a disaster recovery center HLR, i.e., configure a common HLR as a disaster recovery center HLR which is used to backup multiple HLRs, keeping the external interface and the mechanism of the internal software and hardware of the disaster recovery center HLR unchanged; then establishing network connections between each operating active HLR and the disaster recovery center HLR, loading subscriber data of each active HLR to the disaster recovery center HLR through uniform-formatted text files which describe standard services of the protocol in a standard format;

If no active HLR fails, i.e., during normal operation, said active HLRs synchronizing varied subscriber data to the disaster recovery center HLR;

If an active HLR fails, the signaling to it being forwarded to the disaster recovery center HLR to process through modifying route configuration of the corresponding service switching point;

Next, determining whether the active HLR recovers; if so, recovering the data of said active HLR by said disaster recovery center HLR through uniform-formatted text files, redirecting the signaling to said active HLR from said disaster recovery center HLR through modifying route configuration of the corresponding service switching point after the data of said active HLR and disaster recovery center HLR is consistent; otherwise the disaster recovery center HLR will process the signaling.

In the embodiment, each of the uniform-formatted text files may contain a special field for recording the special service in the internal format of the corresponding active HLRs. Wherein, standard services of the protocol will be described in the standard format; special service data of the active HLRs will be written into the special fields to record special service data outputted from the active HLRs in the internal format of corresponding active HLRs; During parsing the data of the active HLRs, it is enough to store transparently: accordingly, during the data recovery after the active HLRs recovers, the disaster recovery center HLR export the data to the active HLRs transparently, and the active HLRs will parse them on their own.

To enhance security further, each disaster recovery center HLR and each operating active HLR may be configured with a communication device responsible for external communication, respectively; said communication device may be a common PC (personal computer) server. The communication device of each active HLR is designed to convert varied subscriber data into uniform-formatted text files and store said files under the specified directory of each active HLR; the communication device of the disaster recover center HLR is designed to record IP (Internet Protocol) addresses of said active HLRs through configuration files and obtaining said files of varied subscriber data from said specified directory periodically.

To enhance transmission efficiency, said uniform-formatted text files may be stored in fixed length and transmitted between the disaster recovery center HLR and the active HLRs through FTP (File Transfer Protocol); when filling up a file, the information can be stored in a newly-established file; the disaster recovery center HLR abstracts said files and then deletes them automatically.

During normal operation, synchronizing the varied data of the active HLRs to the disaster recovery center HLR can be implemented by transferring varied subscriber data with the format of uniform-formatted text file.

There are usually 3 standard methods to modify route configuration of corresponding STPs (Service Switching Point) to realize the redirection of the signaling: modifying the GT (Global Title) translation table; configuring active/backup routes, and configuring the backup subsystem. Through one of said configuration methods, manual and auto switching of signaling can be achieved. For any HLR that plays a very important role in the mobile network, care should be taken before the route configuration of the corresponding service switching point is modified. Auto and manual switching of signaling may be achieved through a special configuration method; however, manual mode is proposed to prevent switching by mistake, i.e., manual signaling switching is performed after a fault is confirmed.

During the actual implementation, the traditional active HLRs and the disaster recovery center HLR may be connected by private lines, and preferably 2 Mbps transmission rate or more.

The invention claimed is:

1. A method for backup of Home Location Register (HLR), comprising: configuring a common HLR as a disaster recovery center HLR which is used to backup multiple active HLRs, then establishing network connections between each of the multiple active HLRs and said disaster recovery center HLR, and then loading subscriber data of each of the multiple active HLRs to said disaster recovery center HLR through uniform-formatted text files which describe standard services of the protocol in a standard format;

During normal operation, synchronizing varied data of each of the multiple active HLRs to said disaster recovery center HLR;

If one HLR of the multiple active HLRs fails, forwarding the signaling, which is sent to the one HLR of the multiple active HLRs, to the disaster recovery center HLR to process through modifying route configuration of a corresponding service switching point;

recovering the data of the one HLR of the multiple active HLRs by said disaster recovery center HLR through uniform-formatted text files after the one HLR of the multiple active HLRs recovers, redirecting the signaling to the one HLR of the multiple active HLRs from said disaster recovery center HLR through modifying route configuration of the corresponding service switching point after the data of the one HLR of the multiple active HLRs and the disaster recovery center HLR is consistent.

2. A method for backup of HLR according to claim 1, wherein each of said uniform-formatted text files contains a special field for recording special service in an internal format of each of the multiple active HLRs.

3. A method for backup of HLR according to claim 1, wherein each disaster recovery center HLR and each of the multiple active HLRs are configured with a communication device responsible for external communication, respectively, the communication device of each of the multiple active HLRs is designed to convert varied subscriber data into uniform-formatted text files and store the uniform-formatted text files under a specified directory of each of the multiple active HLRs the communication device of the disaster recover center HLR is designed to record IP addresses of the multiple active HLRs through configuration files and obtaining the uniform-formatted text files of varied subscriber data from said specified directory periodically.

4. A method for backup of HLR according to claim 1, wherein said uniform-formatted text files are stored in fixed length and transmitted between the disaster recovery center HLR and the multiple active HLRs through File Transfer Protocol.

5. A method for backup of HLR according to claim 1, wherein synchronizing the varied data of each of the multiple active HLRs to said disaster recovery center HLR is implemented by transferring varied subscriber data with the uniform-formatted text files.

6. A method for backup of HLR according to claim 1, wherein the modifying route configuration of the corresponding service switching point refers to automatic or manual signaling switching with different configuration method.

7. A method for backup of HLR according to claim 1, wherein the multiple active HLRs and said disaster recovery center HLR are connected by private lines.

* * * * *